(12) United States Patent
Klug et al.

(10) Patent No.: US 8,186,770 B2
(45) Date of Patent: May 29, 2012

(54) ELECTRONICALLY TRIGGERABLE VEHICLE BRAKE SYSTEM OPERATING ON THE RETURN PRINCIPLE, AND METHOD FOR CONTROLLING OR REGULATING THE SYSTEM

(75) Inventors: Andreas Klug, Untergruppenbach (DE); Peter Zegelaar, JD Heerlen (NL); Heiner Hild, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 11/575,422

(22) PCT Filed: Sep. 7, 2005

(86) PCT No.: PCT/EP2005/054425
§ 371 (c)(1),
(2), (4) Date: Mar. 16, 2007

(87) PCT Pub. No.: WO2006/029979
PCT Pub. Date: Mar. 23, 2006

(65) Prior Publication Data
US 2008/0093919 A1   Apr. 24, 2008

(30) Foreign Application Priority Data
Sep. 18, 2004   (DE) .......................... 10 2004 045 391

(51) Int. Cl.
*B60T 13/20* (2006.01)
*B60T 8/40* (2006.01)

(52) U.S. Cl. ....... 303/11; 303/20; 303/115.2; 303/116.1
(58) Field of Classification Search .................... 303/10, 303/11, 116.1, 113.1, 115.1, 115.2, 115.4, 303/115.5, 116.2, 119.1, 20
See application file for complete search history.

(56) References Cited

U.S. PATENT DOCUMENTS

| | | | | |
|---|---|---|---|---|
| 5,188,440 A * | 2/1993 | Muller et al. | ................... | 303/10 |
| 5,197,788 A * | 3/1993 | Fennel et al. | .............. | 303/119.1 |
| 5,487,593 A | 1/1996 | Potts et al. | | |
| 6,113,197 A * | 9/2000 | Kuroki et al. | ................... | 303/11 |
| 6,339,738 B1 | 1/2002 | Kohl et al. | | |
| 7,174,247 B2 * | 2/2007 | Gronau et al. | .................. | 701/70 |

FOREIGN PATENT DOCUMENTS

| | | |
|---|---|---|
| DE | 39 35 071 A1 | 4/1991 |
| DE | 42 32 614 A1 | 3/1994 |
| DE | 44 40 517 A1 | 5/1996 |
| DE | 196 32 311 A1 | 2/1998 |
| DE | 199 60 336 A1 | 6/2001 |
| DE | 103 09 418 A1 | 11/2003 |

OTHER PUBLICATIONS

EPO translation of DE 10309418 A1, Nov. 6, 2003.*

* cited by examiner

*Primary Examiner* — Thomas J Williams
(74) *Attorney, Agent, or Firm* — Ronald E. Greigg

(57) ABSTRACT

A method for controlling and/or regulating an electronically triggerable vehicle brake system, operating on the return principle, and to such a brake system in which by an adapted triggering of the drive motor for the pressure generator, the pumping quantity of the pressure generator is varied such that the difference between these flows of pressure medium to and from the master cylinder assumes a minimal value, preferably a value of zero. To that end, the driving rpm of the pressure generator is preferably varied. The trigger signal for the drive motor can be ascertained by an electronic control unit from measurement outcomes from sensors within the vehicle brake system, or it can be estimated with the aid of a hydraulic volume model stored in memory in the control unit. The trigger signal can be controlled or regulated.

10 Claims, 2 Drawing Sheets

ELECTRONICALLY TRIGGERABLE VEHICLE BRAKE SYSTEM OPERATING ON THE RETURN PRINCIPLE, AND METHOD FOR CONTROLLING OR REGULATING THE SYSTEM

CROSS-REFERENCE TO RELATED APPLICATION

This application is a 35 USC 371 application of PCT/EP 2005/054425 filed on Sep. 7, 2005.

BACKGROUND OF THE INVENTION

1. Field of the Invention

The invention is directed to an improved method for controlling or regulating an electronically triggerable vehicle brake system operating on the return principle, and to an improved electronically controlled vehicle brake system operating on the return principle.

2. Description of the Prior Art

An electronically controlled vehicle brake system, operating on the return principle, is known for instance from German Patent Disclosure DE 199 40 263 A1. This known vehicle brake system has a master cylinder, actuatable by pedal by the driver, with two brake chambers to each of which one brake circuit is connected. In each brake circuit there are two wheel brakes as well as two devices for modulating the brake pressure at these wheel brakes. Each device for modulating the brake pressure includes one pressure buildup valve and one pressure reduction valve. The pressure buildup valve is connected into a first pressure fluid connection or line between the master cylinder and the wheel brake, while the pressure reduction valve is disposed in a second pressure fluid connection or line, which carries pressure fluid away from the wheel brake. An externally driven pressure generator is also present. Its intake side is coupled downstream of the pressure reduction valve to the second pressure fluid connection that carries pressure fluid away, while its intake side is connected upstream of the pressure buildup valve to the first pressure fluid connection and to the master cylinder.

For regulating the brake pressure in one of the wheel brakes, there is an electronic control unit. It triggers the pressure buildup valve, the pressure reduction valve, and the pressure generator in accordance with the instantaneous slip ratios at the wheel brakes of a vehicle. When wheel slip is ascertained, that is, if a wheel is tending to lock, the pressure generator pumps pressure fluid out of the associated wheel brake away via the pressure reduction valve, until the brake pressure has finally been reduced to such an extent that there is no longer any risk of locking. During this time, the pressure buildup valve is closed. This operating principle is called the return principle.

In such return vehicle brake systems, in the active mode, that is, when the pressure generator is triggered, this pressure generator is driven with an at least intermittently constant rpm. In the event that at least the brake pressure of one vehicle wheel of one brake circuit is above the set-point pressure, then as explained, pressure fluid is fed back out of the affected wheel brake into the brake fluid chamber of the master cylinder via the opened pressure reduction valve. This results in either a brake pedal that moves backward counter to the actuation direction or, via the floating piston of the master cylinder, a stream of pressure fluid into the second brake chamber. In an ensuing new pressure buildup phase, that is, the next time one of the pressure buildup valves is opened, the brake circuit is again supplied with pressure fluid from the master cylinder. Because of the varying quantities of pressure fluid in the master cylinder as a result, pedal motions occur, which the driver perceives as annoying. In addition to the mechanical feedback at the brake pedal, unwanted noise is produced. The relatively low frequency with which these pedal motions occur must be distinguished from the high-frequency pedal motions caused by the intermittent mode of operation of the radial piston pumps that are typically used as the pressure generator.

SUMMARY AND ADVANTAGES OF THE INVENTION

By comparison, the proposed method for controlling or regulating an electronically controlled vehicle brake system operating on the return principle, and the proposed electronically controlled vehicle brake system operating by this method, have the advantage that the described low-frequency pedal feedback motions can be reduced or eliminated entirely. The driver is less irritated as a result, and operating noise is reduced as well. As a consequence, pedal comfort and in the final analysis the driving comfort of the vehicle are increased overall. Further advantages or advantageous refinements of the invention are described.

The method can be employed especially effectively if the rpm at which the pressure generator is driven is varied. The variation in the driving rpm of the pressure generator can be regulated by measuring the travel distance and/or the speed with which an actuation of the master cylinder takes place. This actuation can be detected by means of suitable travel sensors, delivered to an electronic control unit, and there processed further into a trigger signal for driving the pressure generator. Alternatively, for this purpose the trigger signal for driving the pressure generator can also be controlled. To that end, a hydraulic volume model of the vehicle brake system is stored in memory in the control unit, and from that the required trigger signal can be ascertained by estimation. This model can be improved by incorporating measured values from pressure sensors that may be present in the vehicle brake system.

BRIEF DESCRIPTION OF THE DRAWINGS

One exemplary embodiment of the invention is described in detail herein below, with reference to the drawings, in which.

The flow chart in FIG. 2 shows this vehicle brake system in a schematically simplified view.

DESCRIPTION OF THE PREFERRED EMBODIMENT

Figure 1:
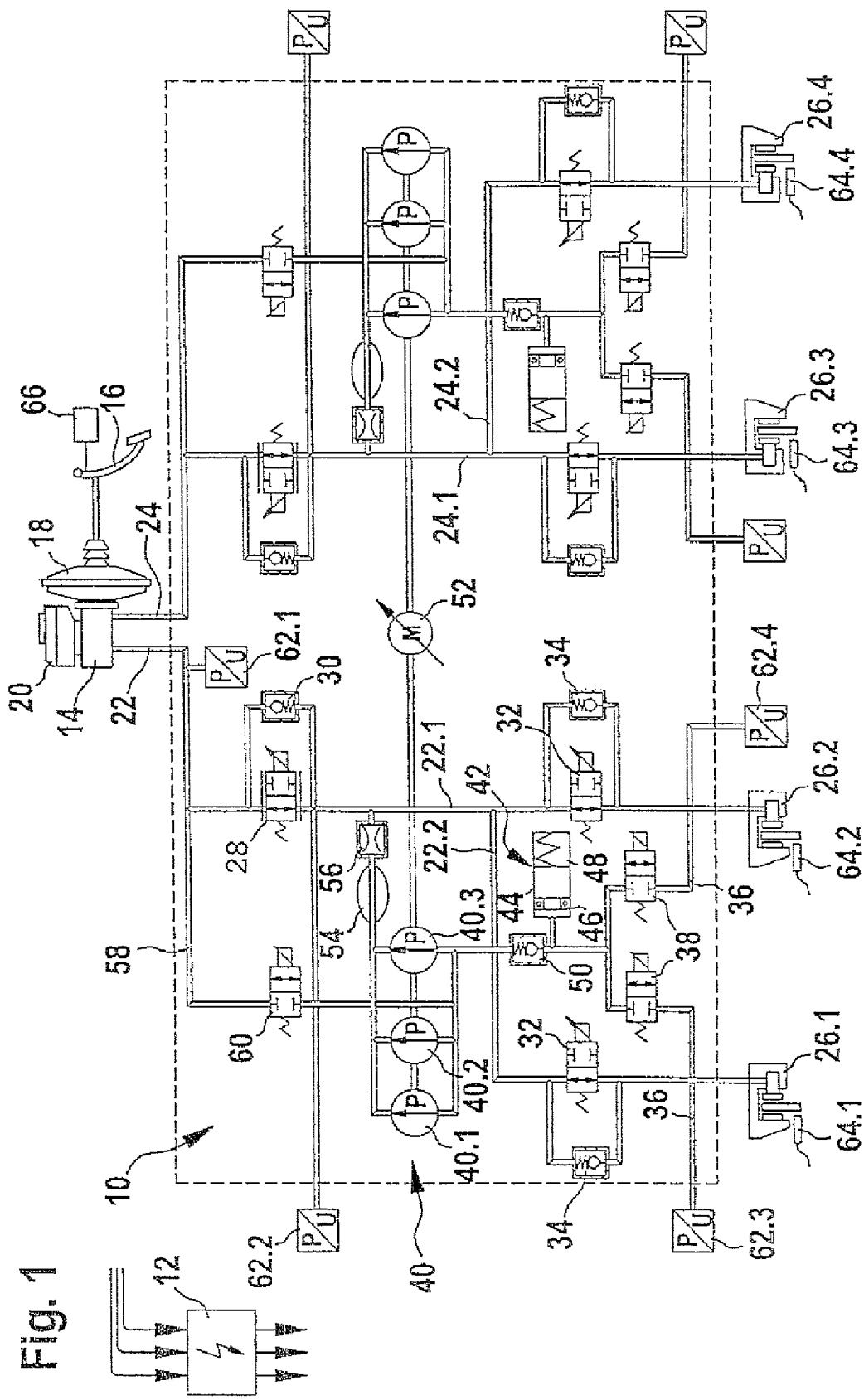
FIG. 1 shows as an example the construction, known per se, of an electrohydraulic vehicle brake system operating on the return principle.

The vehicle brake system 10 shown in FIG. 1 is as an example an electrohydraulic brake system with a service brake operated by external force and a secondary brake operated by muscle power, which can be switched over as needed by an electronic control unit 12 from a normal braking mode to an anti-lock braking mode, traction control mode, or a vehicle stability control mode. The construction of this vehicle brake system shown and described below in detail is part of the known prior art.

The vehicle brake system 10 includes a master cylinder 14, which can be actuated by the driver by muscle power via a brake pedal 16. Preceding the master cylinder 14 is a vacuum pressure booster 18, which converts the actuation force of the driver into a higher actuation force. A fluid tank 20 communicates with a master cylinder 14, and pressure fluid can flow to the vehicle brake system 10 from this tank as needed. Two brake circuits 22, 24, separated hydraulically from one another but constructed symmetrically, are connected to the master cylinder 14. Below, only the brake circuit 22 will be described in detail. Two wheel brakes 26.1-2, which in the exemplary embodiment are the rear wheel brakes of the vehicle, are located in this brake circuit 22. The front wheel brakes are connected in the second brake circuit 24 (known as a black-white division of the brake circuits). The brake circuit 22 branches into one first and one second brake circuit branch 22.1-2, each with one wheel brake 26 contacted with it.

Upstream of this branch, a so-called switchover valve 28 is connected into the brake circuit 22. This valve is an electronically triggerable 2/2-way proportional magnet valve, which is kept in its basic position by a restoring spring. In this restoring spring, the switchover valve 28 assumes an open position. In a bypass around the switchover valve 28, there is a check valve 30, which allows a flow of pressure fluid in the direction from the master cylinder 14 to the wheel brake 26 and blocks it in the opposite direction, that is, from the wheel brake 26 back to the master cylinder 14. Downstream of the switchover valve 28, one pressure buildup valve 32 is connected hydraulically upstream of each wheel brake 26. This pressure buildup valve 32 is also an electronically actuated 2/2-way proportional magnet valve, which is kept in the open position by a restoring spring and is actuatable in the direction of its blocking position in a continuously variable manner by electrical triggering. A check valve 34 is also connected parallel to this pressure buildup valve 32, and this check valve 34 acts such that it allows the outflow of pressure fluid from the wheel brake 26 to the master cylinder 14, but blocks an inflow of pressure fluid from the master cylinder 14 in the direction of the wheel brake 26.

Between one wheel brake 26 and the associated pressure buildup valve 32, an outflow line 36 branches off, in which a pressure reduction valve 38 is located. This pressure reduction valve 38 controls a pressure fluid connection from the wheel brake 26 to the intake side of a pressure generator 40. The pressure reduction valve 38 is an electronically reversible 2/2-way valve, which blocks in the basic position defined by a spring. Also located in the outflow line 36 is a so-called low-pressure reservoir 42. This low-pressure reservoir 42 comprises a spring-loaded piston 44, which is guided movably in a cylinder and which divides a work chamber 46 from a spring chamber 48. In the work chamber 46, pressure fluid that has flowed out of the wheel brake 26 can be temporarily stored. A check valve 50, also located in the outflow line 36, prevents a return flow of pressure fluid from the pressure generator 40 back into one of the wheel brakes 26 when the pressure reduction valve 38 is open.

For each brake circuit, three parallel-connected pump units 40.1-3, for example, are used as the pressure generator 40. These pump units 40.1-3 are all driven by one common drive motor 52. According to the invention, this drive motor 52 is meant to be electronically regulatable, so that the rpm at which the pump drive is effected is variable. The pump units 40.1-3 pump pressure fluid back into the brake circuit 22, via a pulsation damper 54 and a downstream throttle 56, specifically into a line region that is located hydraulically downstream of the switchover valve 28.

In addition to what has been already described, there is an intake line 58 of the vehicle brake system 10. This intake line 58 branches off from the brake circuit 22 immediately upstream of the switchover valve 28 and likewise leads to the intake side of the pressure generator 40. The intake line 58 is controlled by a high-pressure switching valve 60, which can be switched over from its closing position into its open position by electronic triggering counter to the force of a restoring spring. In the open state of the high-pressure switching valve 60, the pump units 40.1-3 can aspirate pressure fluid from the master cylinder 14, for instance when the pressure reduction valves 38 of the wheel brakes 26 are closed, the low-pressure reservoir 42 is evacuated, yet because of the braking situation a pressure buildup in at least one of the wheel brakes 26 of the brake circuit 22 is still necessary.

For regulating the braking force at wheel brakes 26 of the vehicle brake system 10, there are sensors 62, whose measurement signals are delivered to the electronic control unit 12 as input variables. This electronic control unit 12 evaluates these input variables (represented in FIG. 1 by arrow symbols pointing in the direction of the control unit 12) for trigger signals (arrow symbols that point away from the control unit 12), with which the aforementioned magnet valves 28, 32, 38, 60 as well as the drive motor 52 of the valve 40 are triggered. A first pressure sensor 62.1 measures the pressure in the brake circuit 22 generated by the driver as a result of actuation of the master cylinder 14. A second pressure sensor 62.2 detects the pressure level directly downstream of the switchover valve 28, and third and fourth pressure sensors 62.3, 62.4 measure the brake pressure in the two wheel brakes 26.1-2 of the brake circuit 22. Each vehicle wheel is furthermore assigned one wheel sensor 64.1-4, which detects the instantaneous wheel speed and thus its change over time. A brake light switch 66 is also present, which is connected to the brake pedal 16 of the vehicle brake system 10 and detects its actuation by the driver.

The mode of operation of the vehicle brake system 10 described is as follows:

1. Normal Braking Mode:

In malfunction-free normal braking, all the magnet valves 28, 32, 38, 60 are triggered electrically. Thus the switchover valve 28 blocks off the master cylinder 14 from the wheel brake 26. The pressure buildup valve 32 is closed, and simultaneously the pressure reduction valve 38 is opened. Thus no brake pressure is applied to the wheel brakes 26. Upon an actuation of the brake pedal 16, the brake light switch 66 opens and a braking action desired by the driver is detected by the control unit 12. Depending on the magnitude of this braking demand-detected by the pressure sensor 62.1 associated with the master cylinder - the electronic control unit 12 directs the pressure buildup valve 32 into its open position and switches the pressure reduction valve 38 over to the closing position. Simultaneously, the drive motor 52 of the pressure generator 40 is supplied with current, and if the low-pressure reservoir 42 is not adequately supplied with pressure fluid then the high-pressure switching valve 60 is opened. With the high-pressure switching valve 60 open, the pressure generator 40 pumps pressure fluid from the master cylinder 14 into the wheel brake 26 and brings about a pressure buildup there. Upon relief of the brake pedal 36, or in other words a retraction of the braking demand, the triggering of the pressure buildup valve 32 is retracted, and the pressure reduction valve 38 is supplied with current. Pressure fluid can thus flow out of the wheel brake 26 to the low-pressure reservoir 42, or if the low-pressure reservoir 42 is full, it can flow toward the pressure generator 40. The pump units 40.1-3 of the pressure generator pump the excess pressure fluid back into the brake branch 22.1 and from there as needed, by triggering of the switchover valve 28, back to the master cylinder 14, or through the re-opened pressure buildup valve 32 back to the wheel brake 26.

If operation is impeded, for instance if the supply voltage has failed, all the magnet valves 28, 32, 38, 60 are necessarily in the basic position shown in FIG. 1. Because of the hydraulic passage then existing from the master cylinder 14 to the wheel brakes 26, a braking event that is manually controlled by the driver by muscle power can thus be performed.

2. Anti-lock Braking Mode:

If it is found through the wheel sensors 26.1-4 of the vehicle wheels that one of the wheels of the vehicle is tending to lock during a braking event, then in the control unit 12 a brake pressure reduction at the affected wheel brake 26 is initiated, regardless of the braking demand. By closure of the pressure buildup valve 32 and opening of the pressure reduction valve 38, as explained above, the pressure generator 40 driven in this process is capable of pumping pressure fluid out of the wheel brake 26 and thus of reducing the wheel brake pressure. The pressure in each wheel brake 26 can be controlled or regulated individually as a function of the slip conditions pertaining at the vehicle wheel. Once the risk of wheel locking has ended, the affected pressure reduction valve 38 is closed again, the pressure buildup valve 32 is opened, and if applicable, the triggering of the pressure generator 40 is discontinued. The next time a braking demand is asked for (actuated brake pedal 16 and actuated brake light switch 66), a pressure buildup in the wheel brakes 26 is brought about by triggering the pump again. The master cylinder 14 actuated by the driver during a braking event serves solely as a device for detecting the braking demand. The pressure required in the wheel brakes 26 is generated by the pump elements 40.1-3 of the pressure generator 40 that are driven by electric motor, and thus this pressure is generated by external force.

3. Traction Control Mode:

In this operating state of the vehicle brake system 10, no actuation of the master cylinder 14 by the driver takes place. At the driven vehicle wheels, the wheel sensors 26.1-4 ascertain increased wheel slip, or in other words a spinning wheel, for instance by comparing the vehicle speed with the wheel speed. If the wheel is spinning, the control unit 12 automatically brakes the affected wheel, by triggering the pressure generator 40 and pumping pressure fluid through the buildup valve 32, which in its basic position is open, to the wheel brake 26. The pump elements 40.1-3 aspirate pressure fluid for this purpose from the low-pressure reservoir 42, or if the high-pressure switching valve 60 is open, from the supply tank 20. The pressure reduction valve 38 during this time is likewise in its basic blocking position, so that a pressure buildup takes place. Once the wheel speed correlates with the vehicle speed again, pressure holding can be done by triggering the pressure buildup valve 32, and as a result the pressure fluid, which is at braking pressure, is trapped between the closed buildup valve 32, the closed reduction valve 38 and the associated wheel brake 26. A further pressure buildup if it becomes necessary in the applicable wheel brake 26 is effected as described by triggering of the pressure reduction valve 38. This valve then assumes its open position, so that the pressure generator 40, which is still being driven as before, can pump pressure fluid out of the wheel brake 26.

As the above description shows, in the various operating states of the vehicle brake system 10, pressure fluid displacements take place inside the brake system. Particularly the streams of pressure fluid affecting the master cylinder 14 trigger feedback motions at the brake pedal 16, because of the existing hydraulic operative connection. These feedback motions are irritating to the driver who is actuating the brake pedal 16 with his foot. Streams of pressure fluid to the master cylinder 14 cause a motion of the brake pedal 16 counter to the actuation direction, while streams of pressure fluid away from the master cylinder 14 cause a motion of the brake pedal 16 in the actuation direction. Operating noise can occur with the pulsations of the pedal. The pedal motions that occur in the case of a regulating event of the vehicle brake system have a relatively low frequency, in the range between 0.5 and approximately 6.0 Hz. The low frequency distinguishes the regulation-caused pedal pulsations from pump-caused pedal pulsations. The latter pulsations occur because of the intermittent operating principle of the pump elements 40.1-3 and have a correspondingly high frequency. Piston pumps are typically used as the pump elements 40.1-3.

The invention seeks to damp the low-frequency, regulation-caused pedal pulsations by ideally balancing the streams of pressure fluid toward the master cylinder 14 and the streams of pressure fluid away from the master cylinder 14. In other words, the difference between these streams of pressure fluid should assume the least possible amount, preferably an amount of zero. This can advantageously be achieved by varying the driving rpm of the pressure generator 40.

The volumetric flow from one brake circuit 22 to the master cylinder 14 depends, as explained above, on the actuation state of the switchover valves 28, the pressure buildup valves 32, and the pressure reduction valves 38 of a brake circuit 22 and on the rpm of the pressure generator 40. To avoid pedal motion, the resultant total volumetric flow at the master cylinder 14 must be minimized. Output variables in this respect are the volumetric flows in the wheel brakes 26 as well as the pumping capacities of the pump elements 40.1-3, which can be measured directly via the flow-measuring sensors, or indirectly via the already existing pressure sensors 62, or can be estimated with the aid of a hydraulic volume model of the vehicle brake system that is stored in memory in the electronic control unit 12. In the case of estimation, the volumetric flows at the individual magnet valves 28, 32, 38, 60 result from the set-point pressure requirements and are thus available without delay. Both estimation and indirect measurement can be based on measurement values from any sensor systems that may be present comprising pressure sensors 62 at the master cylinder 14, at the wheel brakes 26, in the brake circuits 22, 24, or at the low-pressure reservoirs 42. The control unit 12 evaluates the measurement outcomes to form a variable trigger signal for the drive motor 52 of the pressure generator 40, the drive motor being designed to operate at a variable rpm. The triggering of the drive motor 52 of the pressure generator 40 can be used in an electronic open- or closed-loop control circuit.

Figure 2:
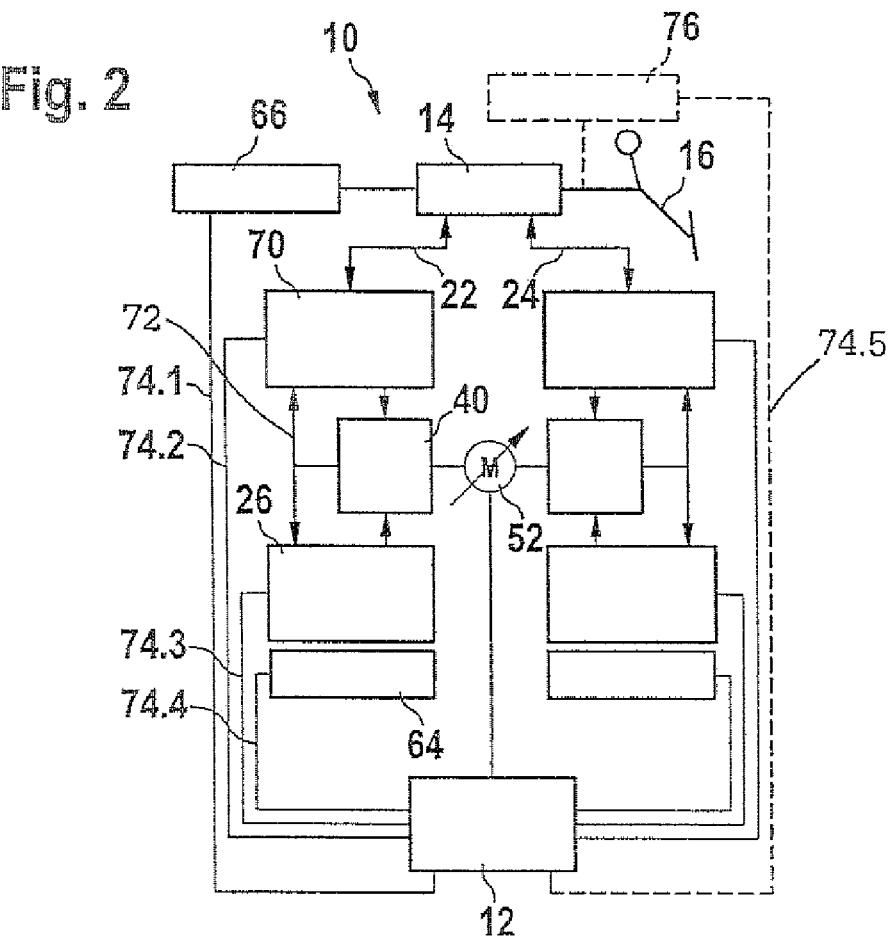

FIG. 2 shows the vehicle brake system already described with the return hydraulics of FIG. 1 again, highly simplified and schematically. A master cylinder 14, designed with two circuits, can be seen, to which two symmetrically embodied brake circuits 22, 24 are connected. The master cylinder 14 is actuatable via a brake pedal 16. Hydraulically downstream of the master cylinder 14 is a unit 70 for modulating the brake pressure. This unit 70 acts, among others, on a wheel brake 26. A pressure generator 40 with a controllable or regulatable drive motor 52 is connected directly hydraulically to the wheel brakes 26, to the unit 70 for modulating the brake pressure, and to a pressure fluid connection 72 of the unit 70 for modulating the brake pressure to the wheel brake 26. Wheel sensors 64 and a sensor 66 in the master cylinder 14 deliver their measurement variables to an electronic control unit 12, which from them calculates trigger signals for the unit 70 for modulating the brake pressure at the wheel brakes 26 and trigger signals to the drive motor 52 for the pressure generator 40. In FIG. 2, the signal lines 74.1-4 can be distinguished by their lesser thickness from the hydraulic lines 72 of the vehicle brake system. Another signal line 74.5 drawn in dashed lines leads from a pedal sensor 76, also shown in dashed lines, connected to the brake pedal 16, to the electronic control unit 12. This is intended to illustrate the alternative option of using a pedal sensor 76 for representing a closed-loop control circuit.

Figure 3:
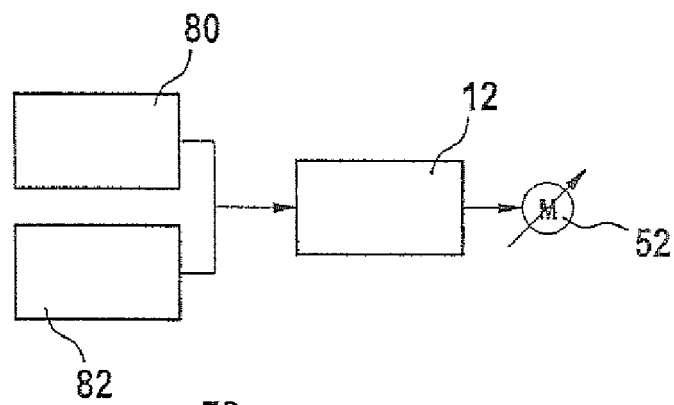
FIGS. 3 and 4 are diagrams schematically showing for drive control and drive regulation, respectively, of the pressure generator.

FIG. 3, again schematically, shows the fundamental concept of the invention, namely to detect the volumetric flows 80 of the pressure generator 40 and the volumetric flows 82 of the wheel brakes 26 by sensors and to deliver the outcome of measurement to an electronic control unit 12, in order from them to ascertain a variable trigger signal for a regulatable drive motor 52 of the pressure generator 40.

Figure 4:
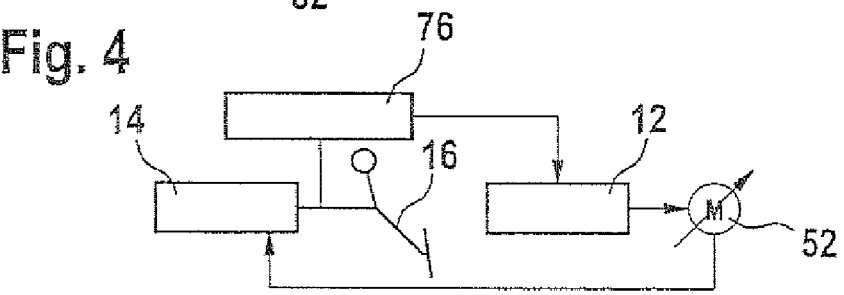

FIG. 4 again shows the closed-loop control circuit mentioned in conjunction with FIG. 1 for triggering the drive motor 52 of the pressure generator 40. To that end, on the brake pedal 16, a pedal travel or pedal speed sensor 76 is provided, whose measurement variable is further processed in the electronic control unit 12. The set-point value for the pedal speed is zero; the controlling variable is the rpm of the pressure generator 40. It is set via the regulatable drive motor 52.

It is understood that changes or additions to the exemplary embodiment described are possible without departing from the fundamental concept of the invention. In this connection, it should be noted that the invention is not limited to an electrohydraulic vehicle brake system, shown in the exemplary embodiment and described in this description, with a service brake operated by external force and a secondary brake operated by muscle power, but instead can be employed in conventional anti-lock, electronic stability, and traction control brake systems that operate by the return principle and in which the required brake pressure is generated solely by muscle power of the driver. It is understood that the invention is also not limited to vehicle brake systems designed with two circuits but instead can be used accordingly in single-circuit systems.

The foregoing relates to a preferred exemplary embodiment of the invention, it being understood that other variants and embodiments thereof are possible within the spirit and scope of the invention, the latter being defined by the appended claims.

The invention claimed is:

1. A method for controlling or regulating an electronically triggerable vehicle brake system, operating on the return principle,
   having a master cylinder, actuatable by muscle power, for supplying at least one wheel brake of a brake circuit with brake pressure,
   having a device for modulating the brake pressure at the wheel brake, which device includes a pressure buildup valve, triggerable by an electronic control unit, in a first pressure fluid connection from the master cylinder to the wheel brake, and a pressure reduction valve, triggerable by the electronic control unit, in a second pressure fluid connection leading away from the wheel brake,
   having a pressure generator drivable by a drive motor that is triggerable by the control unit, an intake side of the pressure generator being connected downstream of the pressure reduction valve to both the second pressure fluid connection and the master cylinder, and a compression side of the pressure generator being connected upstream of the pressure buildup valve to the first pressure fluid connection, and
   having sensors for detecting status parameters of the vehicle brake system, the method comprising:
   by means of at least one sensor device, detecting the status parameters of a pedal actuation speed and/or a pedal travel distance with which an actuation of the master cylinder is effected, and
   by means of the electronic control unit, evaluating the pedal actuation speed and/or pedal travel distance detected and therewith ascertaining a variable trigger signal with which a driving rpm of the drive motor of the pressure generator is varied, based on a specification that a set-point value for the pedal speed is zero.

2. The method as defined by claim 1, wherein for ascertaining the driving rpm of the drive motor at an instance, a hydraulic volume model of the vehicle brake system is stored in memory electronically in the electronic control unit, from which model, as a function of the pedal actuation speed and/or the pedal travel distance, the trigger signal is ascertained by estimation.

3. In an electronically triggerable vehicle brake system, operating on a return principle,
   having a master cylinder actuatable by muscle power for supplying at least one wheel brake of a brake circuit with brake pressure,
   having a device for modulating the brake pressure at the at least one wheel brake, which device includes a pressure buildup valve, triggerable by an electronic control unit, in a first pressure fluid connection from the master cylinder to the wheel brake, and a pressure reduction valve, triggerable by the electronic control unit, in a second pressure fluid connection leading away from the wheel brake,
   having a pressure generator drivable by a drive motor that is triggerable by the control unit, an intake side of the pressure generator being connected downstream of the pressure reduction valve to both the second pressure fluid connection and the master cylinder, and the compression side of the pressure generator being connected upstream of the pressure buildup valve to the first pressure fluid connection, and
   having sensors for detecting status parameters of the vehicle brake system, wherein the control unit comprises a computer program operable to evaluate measurement outcomes of the sensors to perform the method as defined by claim 1.

4. The electrohydraulic vehicle brake system of claim 1, wherein the vehicle brake system comprises a service brake, operated by external force, a secondary brake operated by muscle power, and an electrically triggerable valve assembly which switches the vehicle brake system over from a secondary brake mode to a service brake mode.

5. In an electronically triggerable vehicle brake system, operating on a return principle,
   having a master cylinder actuatable by muscle power for supplying at least one wheel brake of a brake circuit with brake pressure,
   having a device for modulating the brake pressure at the at least one wheel brake, which device includes a pressure buildup valve, triggerable by an electronic control unit, in a first pressure fluid connection from the master cylinder to the wheel brake, and a pressure reduction valve, triggerable by the electronic control unit, in a second pressure fluid connection leading away from the wheel brake,
   having a pressure generator drivable by a drive motor that is triggerable by the control unit, an intake side of the pressure generator being connected downstream of the pressure reduction valve to both the second pressure fluid connection and the master cylinder, and the compression side of the pressure generator being connected upstream of the pressure buildup valve to the first pressure fluid connection, and having sensors for detecting status parameters of the vehicle brake system, wherein the control unit comprises a computer program operable to evaluate measurement outcomes of the sensors to perform the method as defined by claim 2.

6. The electrohydraulic vehicle brake system of claim 2, wherein the vehicle brake system comprises a service brake, operated by external force, a secondary brake operated by muscle power, and an electrically triggerable valve assembly which switches the vehicle brake system over from a secondary brake mode to a service brake mode.

7. The electrohydraulic vehicle brake system of claim 5, wherein the vehicle brake system comprises a service brake, operated by external force, a secondary brake operated by muscle power, and an electrically triggerable valve assembly which switches the vehicle brake system over from a secondary brake mode to a service brake mode.

8. The electrohydraulic vehicle brake system of claim 3, wherein the vehicle brake system comprises a service brake, operated by external force, a secondary brake operated by muscle power, and an electrically triggerable valve assembly which switches the vehicle brake system over from a secondary brake mode to a service brake mode.

9. A method for controlling or regulating an electronically triggerable vehicle brake system, operating on the return principle, having a master cylinder, actuatable by muscle power, for supplying at least one wheel brake of a brake circuit with brake pressure, having a device for modulating the brake pressure at the wheel brake, which device includes a pressure buildup valve, triggerable by an electronic control unit, in a first pressure fluid connection from the master cylinder to the wheel brake, and a pressure reduction valve, triggerable by the electronic control unit, in a second pressure fluid connection leading away from the wheel brake, having a pressure generator drivable by a drive motor that is triggerable by the control unit, an intake side of the pressure generator being connected downstream of the pressure reduction valve to both the second pressure fluid connection and the master cylinder, and a compression side of the pressure generator being connected upstream of the pressure buildup valve to the first pressure fluid connection, and having sensors for detecting status parameters of the vehicle brake system, the method comprising:

varying a pumping quantity of the pressure generator by the control unit as function of the status parameters detected by the sensors, in such a way that a difference between streams of pressure fluid outflowing from the master cylinder and streams of pressure fluid flowing to the master cylinder yields a value of zero;

by means of at least one sensor device, detecting the status parameters of a pedal actuation speed and/or a pedal travel distance with which an actuation of the master cylinder is effected, and by means of the electronic control unit, evaluating the pedal actuation speed and/or pedal travel distance detected and therewith ascertaining a variable trigger signal with which a driving rpm of the drive motor of the pressure generator is varied, based on a specification that a set-point value for the pedal speed is zero.

10. The method as defined by claim 9, wherein the pedal actuation speed and/or the pedal travel distance is zero.

* * * * *